US005485903A

United States Patent [19]
Saito et al.

[11] Patent Number: 5,485,903
[45] Date of Patent: Jan. 23, 1996

[54] REVERSAL PREVENTIVE MECHANISM OF A SILENT TYPE FOR USE IN A FISHING REEL

[75] Inventors: Masaji Saito; Akira Yamaguchi, both of Saitama, Japan

[73] Assignee: Daiwa Seiko, Inc., Tokyo, Japan

[21] Appl. No.: 243,802

[22] Filed: May 17, 1994

[30] Foreign Application Priority Data

May 19, 1993 [JP] Japan .................. 5-031334 U

[51] Int. Cl.⁶ ............................................. A01K 89/02
[52] U.S. Cl. ................. 192/8 R; 74/576; 188/82.4; 192/7; 242/247
[58] Field of Search ................... 192/7, 8 R; 74/576; 242/247, 299, 300; 188/82.3, 82.4

[56] References Cited

U.S. PATENT DOCUMENTS

| | | | |
|---|---|---|---|
| 5,139,214 | 8/1992 | Sato | 242/299 X |
| 5,318,243 | 6/1994 | Hitomi et al. | 242/247 X |
| 5,388,777 | 2/1995 | Sugahara | 188/82.3 X |

FOREIGN PATENT DOCUMENTS 101363  7/1989  Japan .

Primary Examiner—Rodney H. Bonck
Attorney, Agent, or Firm—Longacre & White

[57] ABSTRACT

A reversal preventive mechanism of a silent type is provided for use in a fishing reel which is capable of playing out a fishing line smoothly when the fishing line is played out by means of the reversed rotation of the handle. A spring is wound on a portion of a rachet wheel circumscribing a drive shaft so that the spring is rotated by the rachet wheel through friction. A control member for separating a securing claw from the rachet wheel is rotatably mounted on the portion of the rachet wheel and connected to said spring in such a manner that an engagement portion of the control member is held by and interposed between extension portions of the spring. A pair of pins are provided to regulate the rotation of the control member. The engagement portion of the control member serves to prevent the undesired contraction of the spring when it abuts against either of the pins.

6 Claims, 4 Drawing Sheets

REVERSAL PREVENTIVE MECHANISM OF A SILENT TYPE FOR USE IN A FISHING REEL

BACKGROUND OF THE INVENTION

1. Field of the Invention

The present invention relates to a reversal preventive mechanism for use in a fishing spinning reel or in a closed face reel and, in particular, to reversal preventive mechanism of a silent type which does not produce sound in a fishing line winding direction (in the forwardly rotational direction).

2. Description of Related Art

Conventionally, there are known various reversal preventive mechanisms each for preventing the reversed rotation of a drive shaft which can be rotated in linking with a handle. The conventional reversal preventive mechanisms include a reversal preventive mechanism of a silent type. For example, there is disclosed a reversal preventive mechanism of a silent type in Japanese Utility Model No. Hei. 1-101363. This reversal preventive mechanism includes a reversal preventive gear mounted to a drive shaft adapted to rotate a rotor in accordance with the rotation of a handle in such a manner that the reversal preventive gear can be rotated integrally with the drive shaft, a securing claw engageable with the reversal preventive gear, a control member mounted rotatably to the drive shaft and capable of preventing the engagement between the reversal drive gear and securing claw when it is rotated, and a spring which is frictionally wound round the drive shaft. One end of the spring is secured to the control member in such a manner that the diameter of the spring can be extended when it is rotated forwardly and can be shortened when it is rotated reversely, thereby being able to rotate the control member. Because no contact is made between the reversal preventive gear and securing claw in the forward rotation, the reversal preventive mechanism of a silent type produces no sound and thus allows a silent winding operation.

However, in the above-mentioned conventional silent type reversal preventive mechanism, when the engagement of the securing claw with the reversal preventative gear is released by a stopper lever to thereby allow the gear to be rotated in the reverse direction and the handle is rotated reversely to thereby play out a fishing line positively, there is produced a resistance to the handle rotation, which makes it difficult to play out the fishing line smoothly. This is because the spring is reduced in diameter in the reversed rotation of the handle and the frictional force is thereby increased accordingly.

SUMMARY OF THE INVENTION

In view of the above drawbacks in the prior art, it is an object of the invention to provide a reversal preventive mechanism of a silent type for use in a fishing reel which is capable of playing out a fishing line smoothly when the fishing line is played out by means of the reversed rotation of the handle.

In order to attain the above-noted and other objects, the present invention provides a silent type reversal preventive mechanism for a fishing reel having a drive shaft for rotating a rotor with respect to a reel main body in conjunction with rotation of a handle. The mechanism includes a reversal preventive rachet wheel mounted on the drive shaft to rotate together with the drive shaft; a securing claw rotatably mounted on the main body and biased so as to engage with the rachet wheel; a spring wound round the drive shaft and frictionally rotatable in conjunction with rotation of the drive shaft, the spring having two extension portions extending outward therefrom; and a control member rotatable with respect to the drive shaft, and driven by the spring so as to separate the securing claw from the rachet wheel when the drive shaft is rotated in a first direction, wherein the control member and the spring are interconnected to each other such that a portion of the control member is held by and interposed between the two extension portions.

The portion of the control member, which is held by the two extension portions, serves to prevent such a deformation of the spring that the extension portions are moved closer to each other due to friction produced in conjunction with rotation of the drive shaft in either forward or reversed direction. Thus, it is possible to prevent the undesired decrease of the diameter of the spring and the increase of the frictional resistance at the time of both forward and reversed rotations.

DETAILED DESCRIPTION OF THE PREFERRED EMBODIMENTS

Now, description will be given below in more detail of the invention with reference to the embodiments thereof respectively shown in the accompanying drawings.

Figure 1:
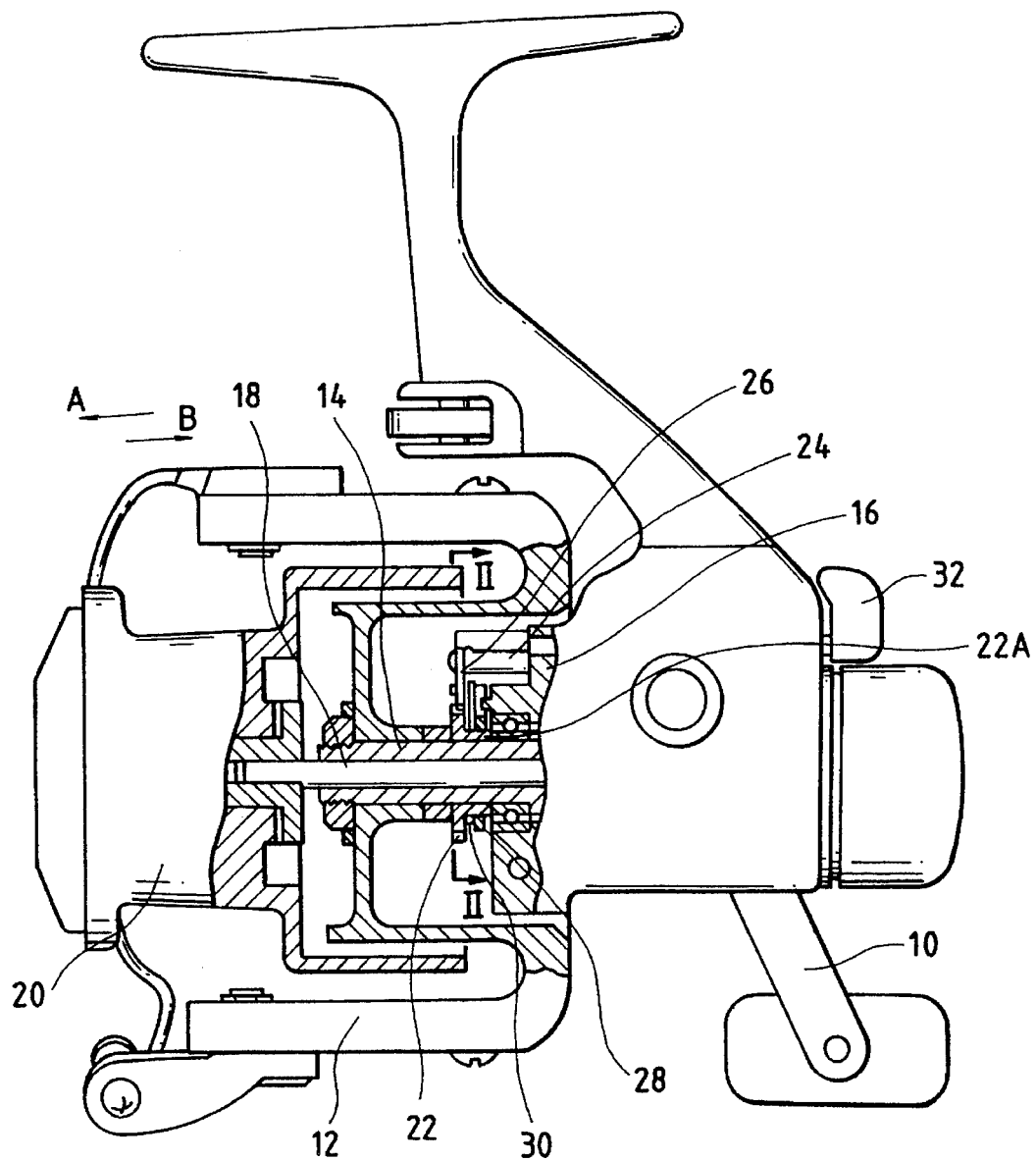
FIG. 1 is a partially sectional side view of a spinning reel incorporating therein a first embodiment according to the invention.
Figure 2:
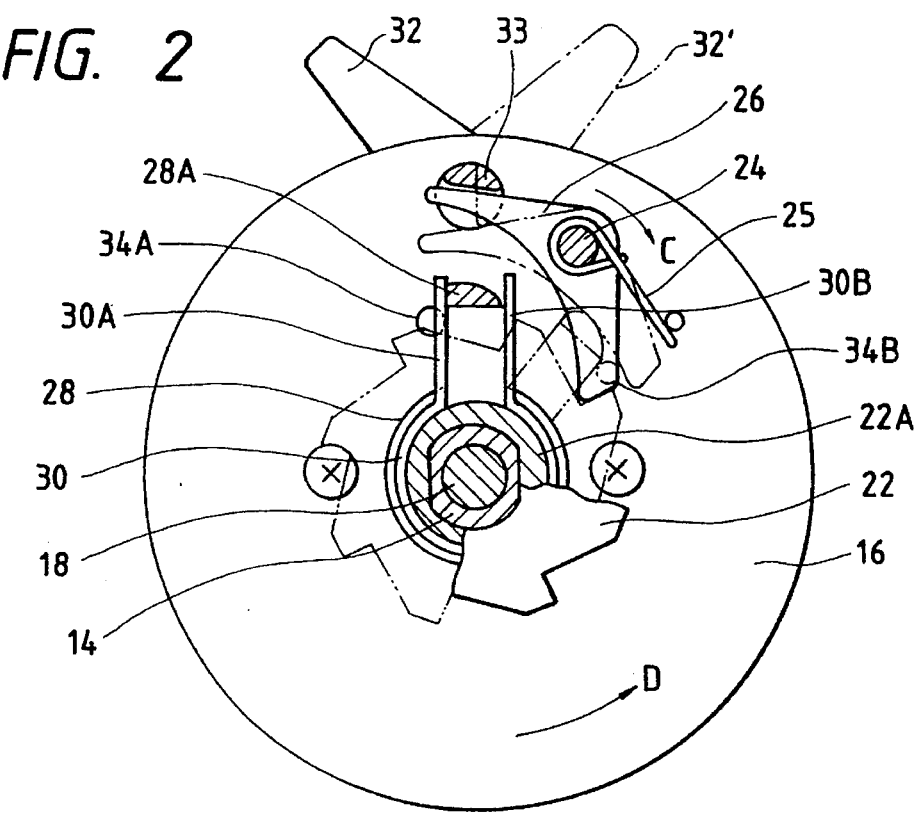
FIG. 2 is a partially sectional front view of the enlarged main portions of the first embodiment shown in FIG. 1.
Figure 3:
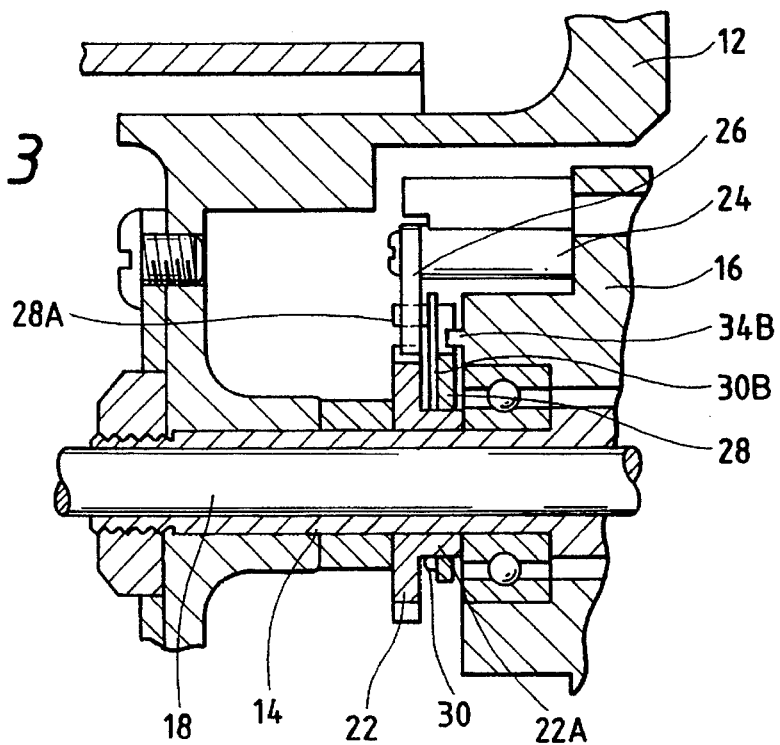
FIG. 3 is a longitudinal sectional view of the enlarged main portions of the first embodiment shown in FIG. 1.

FIG. 1 is a partially sectional side view of a spinning reel for fishing according to the invention, and FIGS. 2 and 3 are respectively enlarged views of the main portions of the above spinning reel. Referring to these figures, upon rotation of a handle 10, a drive shaft 14 is rotated. The rotation of the drive shaft 14 causes a rotor 12 to be rotated. Also, into the drive shaft 14 is inserted a spool shaft 18 which is used to move a spool 20 back and forth in the directions of arrows A and B.

On the other hand, a pivotal shaft 24 is projectingly provided on the upper portion of a reel main body 16 which supports the drive shaft 14 rotatably, and a securing claw 26 is rotatably mounted on the pivotal shaft 24. To the securing claw 26 is mounted a biasing spring 25 which always biases the securing claw 26 clockwise in FIG. 2 (in the direction of arrow C). Also, a stopper cam 33 is provided in a manner to extend through the reel main body 16 and a lever 32 for operating the stopper cam 33 is mounted to the outside of the reel main body 16.

A reversal preventive ratchet wheel 22, which is mounted on the outer periphery of the drive shaft 14 in such a manner that it can be rotated together with the drive shaft 14 by a cylindrical portion 22A, is arranged at a position which allows the ratchet wheel 22 to be engaged with the securing claw 26. A ring-shaped spring 30 is wound round the cylindrical portion 22A of the reversal preventive ratchet wheel 22, while the spring 30 produces a spring force in a direction in which the diameter thereof is decreased. For this reason, if the drive shaft 14 is rotated, then the spring is also going to rotate in the same direction due to a frictional force therebetween.

Also, the two end portions of the spring 30 are respectively extended outwardly to thereby provide two extension portions 30A and 30B which are opposed to each other. On the other hand, a control member 28 is rotatably mounted on the outer periphery of the cylindrical portion 22A. On the upper portion of the control member 28, there is projectingly provided an engaging portion 28A which is held by and between the two extension portions 30A and 30B and is capable of separating the securing claw 26 from the reversal preventive ratchet wheel 22 against the biasing force of the spring 25 by means of the rotation of the control member 28.

Therefore, if the drive shaft 14 is rotated by rotating the handle 10, then the spring 30 and control member 28 are also rotated in the same direction. In order to restrict the rotations of the spring 30 and control member 28 to a given range, there are provided two pins 34A and 34B on the reel main body 16. That is, if the engaging portion 28A of the control member 28 abuts against the pin 34A or 34B, then the rotation of the control member 28 can be restricted. Due to this, the spring 30 and control member 28 stand still with respect to the rotation of the cylindrical portion 22A of the reversal preventive ratchet wheel 22 which rotates integrally with the drive shaft 14, so that there is produced friction between the spring 30 and the cylindrical portion 22A.

In FIG. 2, when the handle 10 is reversely rotated to thereby rotate the drive shaft 14 in a direction shown by arrow D, because the position of the operation lever 32 is a reversal preventive position (shown by a solid line), the securing claw 26 is engaged with the reversal preventive ratchet wheel 22, thereby preventing the drive shaft 14 from rotating in the direction shown by arrow D. In this state, the engaging portion 28A of the control member 28 is in contact with the pin 34A on the side of the extension portion 30A of the spring 30.

Figure 4:
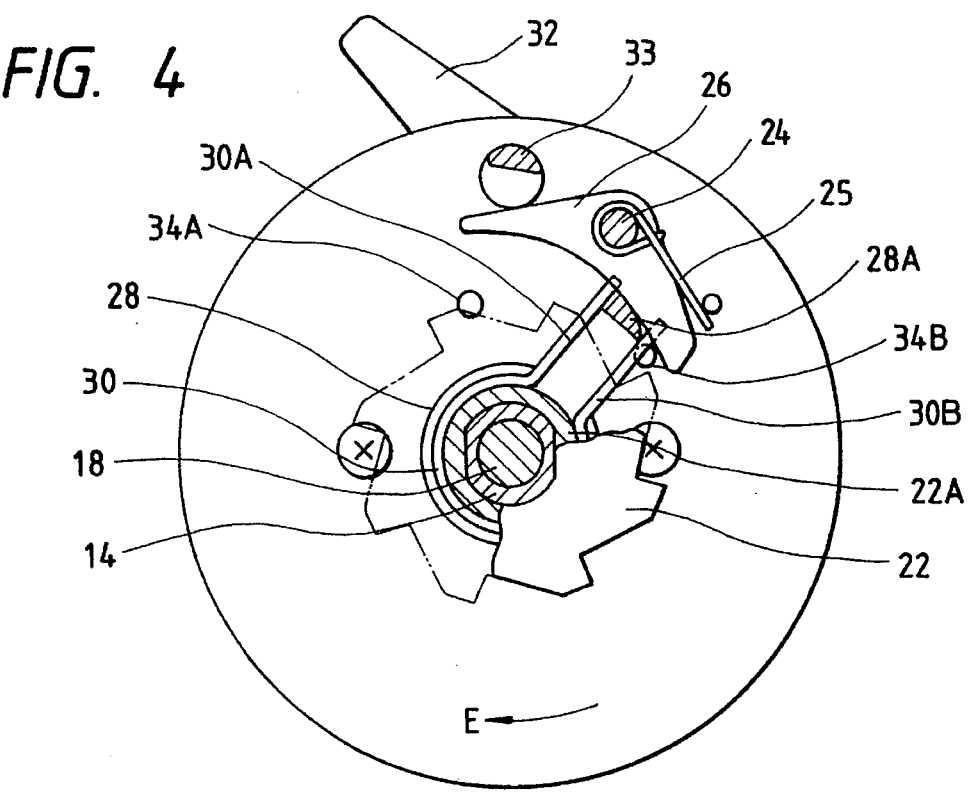
FIG. 4 is an explanatory view of the operation of the main portions of the reel shown in FIG. 1.

In this state, if the handle 10 is rotated in a positive direction in which the fishing line is taken up, then the drive shaft 14 is rotated in a direction of arrow E shown in FIG. 4. With the rotation of the drive shaft 14, the spring 30 and control member 28 are rotated in the same direction and, if the spring extension portion 30B side of the engaging portion 28a of the control member 28 abuts against the other pin 34B, then the control member 28 and spring 30 are caused to stop. Also, the securing claw 26 is separated from the reversal preventive ratchet wheel 22 by the upper surface of the engaging portion 28A. With this arrangement, in the forward or positive rotation, there cannot be produced any sound due to contact between the securing claw 26 and reversal preventive ratchet wheel 26, and thus the fishing line can be wound quietly.

Figure 5:
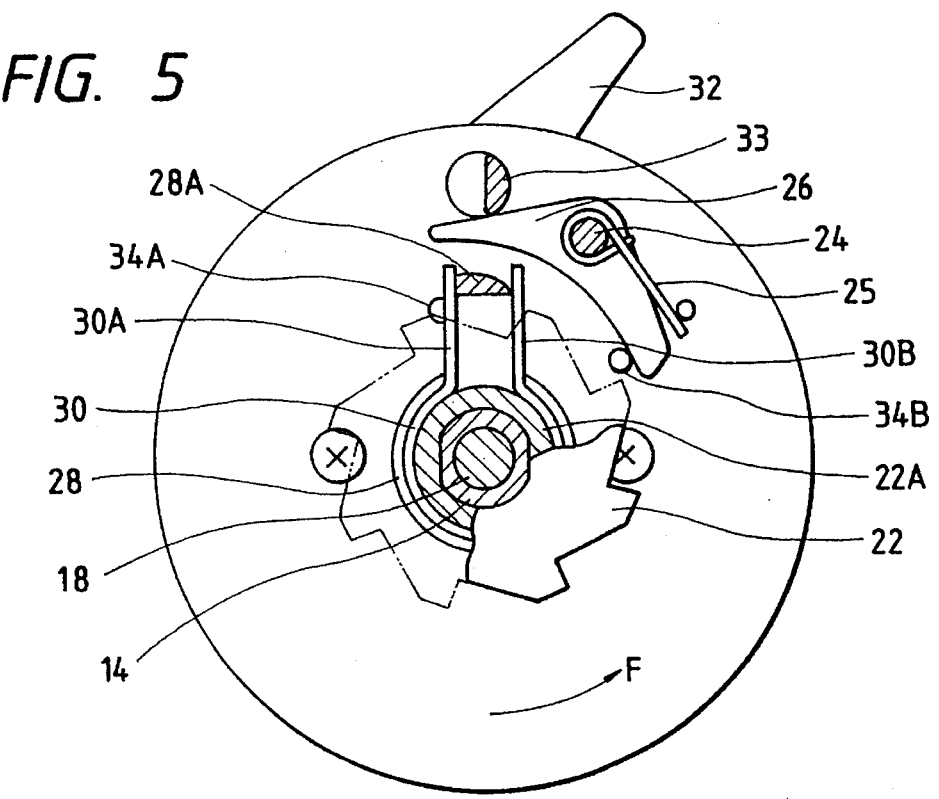
FIG. 5 is an explanatory view of the operation of the main portions of the reel shown in FIG. 1.

Referring now to FIG. 5, in a state in which the position of the operation lever 32 is switched to a reversible position 32' shown by a two-dot chained line in FIG. 2, the handle 10 may be reversely rotated. The securing claw 26 remains separated from the reversal preventive ratchet wheel 22 by the stopper cam 33. In this separated state, that is, in the reversible state, if the handle 10 is reversely rotated, then the drive shaft 14 can be rotated in the direction of arrow F shown in FIG. 5, so that the fishing line can be played out forcibly.

In this case, since a frictional force in the same reversed rotational direction acts on the spring 30, the spring 30 is rotated together with the control member 28. However, if the engaging portion 28A of the control member 28 abuts against the pin 34A, then the rotations of the spring 30 and control member 28 are caused to stop. Because a frictional force in the same direction acts on the spring 30 holding the cylindrical portion 22A of the reverse preventive ratchet wheel 22, the extension portion 30B of the spring 30 is going to move in the diameter decreasing direction in which the spring 30 pushes against the engaging portion 28A but, however, presence of the engaging portion 28A prevents the diameter of the spring 30 from being decreased. Also, the extension portion 30A of the spring 30 is going to be deformed in a direction in which it is separated from the engaging portion 28A to spread the diameter thereof. Therefore, the diameter of the spring 30 can be spread but cannot be decreased, and the frictional force caused by the reversed rotation between the spring 30 and the cylindrical portion 22A of the ratchet wheel 22 rotating integrally with the drive shaft 14 will not be increased, so that the playing-out operation of the fishing line by means of the reversed rotation can be executed smoothly.

In the forward rotation in FIG. 4 as well, similarly, the diameter of the spring 30 is not contracted and the frictional force is not increased. Therefore, the presence of the spring 30 produces only small resistance to the rotation of the handle in the forward rotation or in the reversed rotation.

Figure 6:
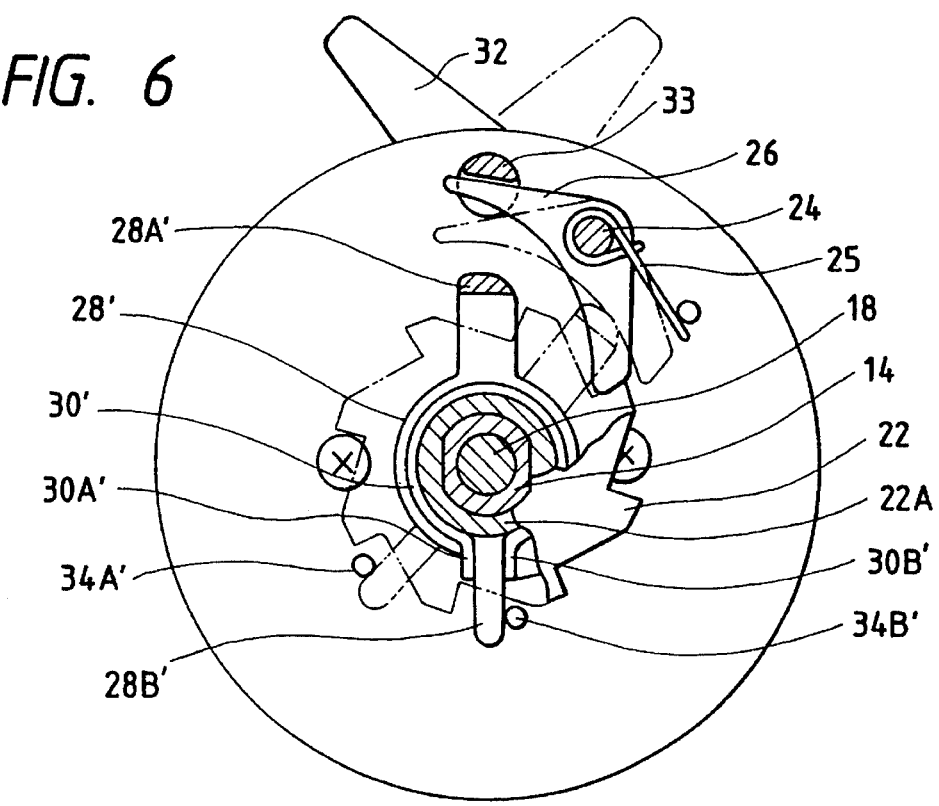
FIG. 6 is a partially sectional front view of a second embodiment according to the invention, corresponding to FIG. 2; and, FIG. 7 is a longitudinal sectional view of the enlarged main portions of the second embodiment, corresponding to FIG. 3.
Figure 7:
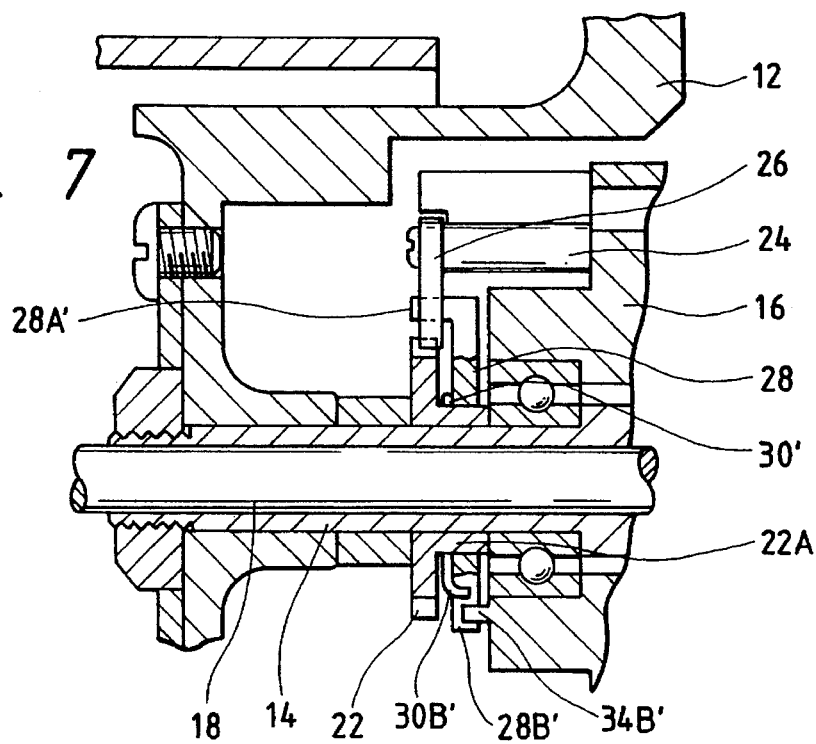

Now, referring to FIGS. 6 and 7, there is shown a second embodiment according to the invention. The second embodiment is different from the first embodiment in that a control member 28 includes a hold portion 28B' as well as an engaging portion 28A' and that the two sides of the hold portion 28B' are held by and between the two extension portions 30A' and 30B' of a spring 30'. If the drive shaft 14 is rotated, then the spring 30' and control member 28' are rotated but, if the hold portion 28B' is abutted against a pin 34A' or 34B', then the rotational movements of the spring 30' and control member 28' are caused to stop. In the second embodiment as well, the extension portions 30A' and 30B' of the spring 30' holds the hold portion 28B' between them and the distance between them is not narrowed. Therefore, similarly to the first embodiment, the existence of the spring 30' produces only a small resistance to the rotation of the handle both in the forward and reversed rotations.

As can be clearly understood from the foregoing description, according to the invention, in order to wind a fishing line in a silent manner when a handle is rotated in the forward direction, there is provided a control member which separates a securing claw engageable with a reversal preventive ratchet wheel for prevention of the reversed rotation of the handle from the reversal preventive ratchet wheel, and part of the reversal preventive ratchet wheel is held by the two extension portions of a spring. Due to this structure, even if the handle is switched into a reversible state by an operation lever and the spring is deformed due to friction produced by the spring when the handle is reversely rotated, a distance between the two extension portions of the spring will never be reduced, which eliminates the possibility of increasing the frictional force. That is, according to the invention, it is possible to provide a reversal preventive mechanism of a silent type for use in a fishing reel which can play out a fishing line smoothly when the fishing line is positively played out by reversely rotating the handle.

What is claimed is:

1. A silent type mechanism for preventing reverse rotation, said mechanism comprising:

a rotatable ratchet wheel;

a securing claw pivotally mounted with respect to said ratchet wheel and biased so as to engage with said ratchet wheel;

a spring wound at least partially around said ratchet wheel and frictionally rotatable in conjunction with rotation of said ratchet wheel, said spring having two extension portions extending outward therefrom; and, a control member rotatable with respect to said ratchet wheel, and driven by said spring so as to separate said securing claw from said ratchet wheel when said ratchet wheel is rotated in a first direction, wherein said control member and said spring are interconnected to each other such that a portion of said control member is held by and interposed between said two extension portions.

2. The mechanism according to claim 1, further comprising:

means abutable against said control member for restricting rotation of said control member with respect to said ratchet wheel to retain said control member in either one of first and second positions, wherein at either one of said first and second positions said extension portions are frictionally biased in conjunction with rotation of said ratchet wheel and the portion of said control member limits rotation of one of said extension portions so as to expand said spring.

3. The mechanism according to claim 2, further comprising:

cam means operable with a lever for separating said securing claw from said ratchet wheel so as to permit said ratchet wheel to rotate in a second direction opposite said first direction.

4. The mechanism according to claim 1, wherein said spring is mounted on a portion of said ratchet wheel extending axially along its axis of rotation.

5. The mechanism according to claim 1, wherein said extension portions extend substantially radially outward and in parallel relation to each other, and define distal ends of said spring.

6. A silent type reversal preventive mechanism for a fishing reel, said mechanism comprising:

a reversal preventive rotatable ratchet wheel;

a securing claw pivotally mounted with respect to said ratchet wheel and biased so as to engage with said ratchet wheel;

a spring wound at least partially around said ratchet wheel and frictionally rotatable in conjunction with rotation of said ratchet wheel;

a control member rotatable with respect to said ratchet wheel, and driven by said spring so as to separate said securing claw from said ratchet wheel when said ratchet wheel is rotated in a first direction; and, means abutable against said control member for restricting rotation of said control member with respect to said ratchet wheel to retain said control member in a first position when said ratchet wheel is rotated in said first direction and a second position when said ratchet wheel is rotated in a second direction opposite to said first direction, wherein a frictional force between said spring and said ratchet wheel when said ratchet wheel is rotated in either of said first or second directions is substantially the same in said first and second positions of said control member.

* * * * *